United States Patent
Billman et al.

(10) Patent No.: US 11,288,721 B2
(45) Date of Patent: Mar. 29, 2022

(54) SYSTEM AND METHOD FOR A DELAYED PURCHASE BASED ON INPUT FROM ANOTHER

(71) Applicant: Comenity LLC, Columbus, OH (US)

(72) Inventors: Christian Billman, Gahanna, OH (US); Uchenna Chilaka, Gahanna, OH (US)

(73) Assignee: Comenity LLC, Columbus, OH (US)

( * ) Notice: Subject to any disclaimer, the term of this patent is extended or adjusted under 35 U.S.C. 154(b) by 459 days.

(21) Appl. No.: 15/700,936

(22) Filed: Sep. 11, 2017

(65) Prior Publication Data

US 2018/0330415 A1 Nov. 15, 2018

Related U.S. Application Data

(60) Provisional application No. 62/505,617, filed on May 12, 2017.

(51) Int. Cl.
*G06Q 30/06* (2012.01)
*G06Q 50/00* (2012.01)
*G06Q 10/10* (2012.01)

(52) U.S. Cl.
CPC ..... *G06Q 30/0613* (2013.01); *G06Q 30/0637* (2013.01); *G06Q 10/107* (2013.01); *G06Q 50/01* (2013.01)

(58) Field of Classification Search
CPC .......... G06Q 30/0613; G06Q 30/0637; G06Q 10/107; G06Q 50/01
See application file for complete search history.

(56) References Cited

U.S. PATENT DOCUMENTS

| | | | | |
|---|---|---|---|---|
| 8,401,914 B1* | 3/2013 | Kim | ...... | G06Q 30/06 705/26.1 |
| 2014/0081804 A1* | 3/2014 | Nuzzi | ...... | G06Q 30/0601 705/26.41 |
| 2014/0279496 A1* | 9/2014 | Rauh | ...... | G06Q 30/02 705/44 |
| 2015/0310536 A1* | 10/2015 | Brady | ...... | G06Q 30/0635 705/26.5 |
| 2017/0076518 A1* | 3/2017 | Patterson | ...... | G06F 21/31 |

OTHER PUBLICATIONS

Ronald E. Goldsmith & David Horowitz (2006) Measuring Motivations for Online Opinion Seeking, Journal of Interactive Advertising, 6:2, 2-14, DOI: 10.1080/15252019.2006.10722114 (Year: 2006).*

* cited by examiner

*Primary Examiner* — Michelle T Kringen

(57) ABSTRACT

A system and method for providing a delayed purchase based on input from another is described. One embodiment receives a selection of a product. A selection of at least one other person and at least one condition is also received. The at least one condition to be met before a purchasing of the product can be completed, the at least one condition to be met via a response received from the at least one other person. The method further receives a prior authorization for a purchase of the product. The system then monitors the at least one condition and the response received from the at least one other person to determine when the at least one condition is met and automatically purchases the product when the at least one condition is met.

9 Claims, 4 Drawing Sheets

SYSTEM AND METHOD FOR A DELAYED PURCHASE BASED ON INPUT FROM ANOTHER

CROSS-REFERENCE

This application claims priority to and benefit of U.S. Provisional Patent Application No. 62/505,617 filed on May 12, 2017, entitled "SYSTEM AND METHOD FOR A DELAYED PURCHASE BASED ON INPUT FROM ANOTHER" by Christian Billman et al., and assigned to the assignee of the present application, the disclosure of which is hereby incorporated by reference in its entirety.

BACKGROUND

Often when shopping, it is desirable to get a second opinion before making a purchase. For example, a consumer sees a garment that they like but they are not certain that it is a good choice. If they are not with, or able to get ahold of, the person whose opinion they want, the consumer may decide to leave the store or the online shop without making the purchase.

BRIEF DESCRIPTION OF THE DRAWINGS

The accompanying drawings, which are incorporated in and form a part of this specification, illustrate various embodiments and, together with the Description of Embodiments, serve to explain principles discussed below. The drawings referred to in this brief description should not be understood as being drawn to scale unless specifically noted.

DESCRIPTION OF EMBODIMENTS

Figure 1:
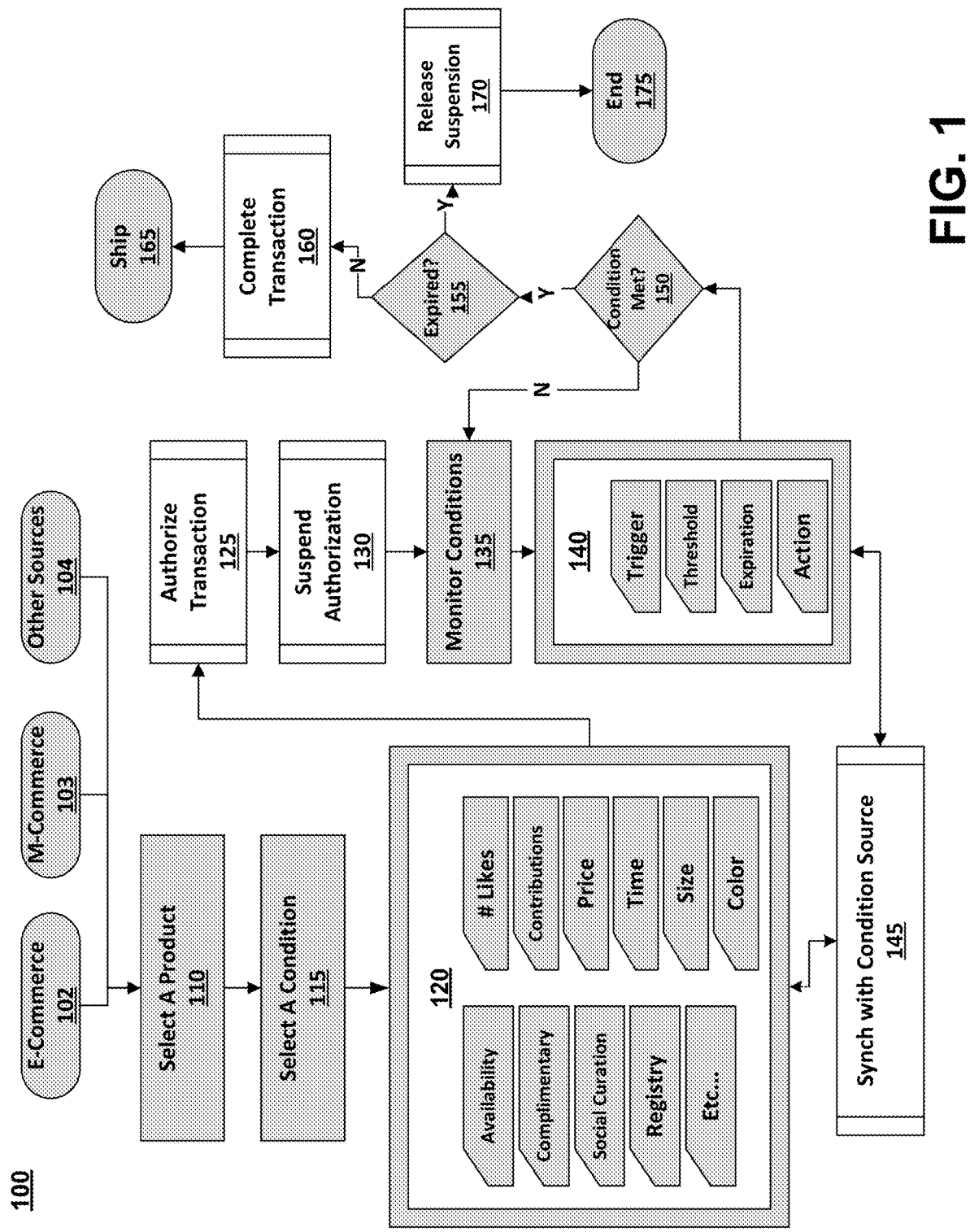
FIG. 1 is a flowchart of a method for a delayed purchase based on input from another, in accordance with an embodiment.

Reference will now be made in detail to embodiments of the subject matter, examples of which are illustrated in the accompanying drawings. While the subject matter discussed herein will be described in conjunction with various embodiments, it will be understood that they are not intended to limit the subject matter to these embodiments. On the contrary, the presented embodiments are intended to cover alternatives, modifications and equivalents, which may be included within the spirit and scope of the various embodiments as defined by the appended claims. Furthermore, in the Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure information of the described embodiments.

Notation and Nomenclature

Unless specifically stated otherwise as apparent from the following discussions, it is appreciated that throughout the present Description of Embodiments, discussions utilizing terms such as "selecting", "outputting", "inputting", "providing", "receiving", "utilizing", "obtaining", "updating", "accessing", "changing", "correlating", "prescreening", "developing", "presenting" or the like, often refer to the actions and processes of an electronic computing device/system, such as a desktop computer, notebook computer, tablet, mobile phone, and electronic personal display, among others. The electronic computing device/system manipulates and transforms data represented as physical (electronic) quantities within the circuits, electronic registers, memories, logic, and/or components and the like of the electronic computing device/system into other data similarly represented as physical quantities within the electronic computing device/system or other electronic computing devices/systems.

Importantly, the embodiments of the present invention, as will be described below, provide an approach for a delayed purchase based on input from another which differs significantly from the conventional shopping processes. In conventional approaches, if a user wished to receive input from another before making a purchase, unless the input was nearly instantaneous, the purchase would be put off until it was again convenient for the consumer to revisit the shop (either online or brick and mortar) with the input from another available. However, the present embodiments, as will be described and explained below in detail, provide a previously unknown procedure to allow a consumer to automatically delay the purchase based on a condition precedent, to be obtained from another, while allowing the consumer to authorize the contingent purchase without requiring the consumer to return to complete the purchase. Thus, embodiments of the present invention provide a novel approach to making a delayed purchase based on input from another which extends well beyond what was previously done by hand or machine in the retail environment.

As will be described in detail, the various embodiments of the present invention do not merely implement conventional retail application processes on a computer. Instead, the various embodiments of the present invention, in part, provide a previously unknown procedure to seamlessly making a delayed purchase based on input from another. Moreover, the present embodiments support the purchase experience without the consumer having to return to the shopping environment and make the purchase once the requisite input from another is obtained. Hence, embodiments of the present invention provide a novel process for making a delayed purchase based on input from another which is necessarily rooted in computer technology to overcome a problem specifically arising in the realm of making a delayed retail purchase based on input from another.

Moreover, the embodiments do not recite a mathematical algorithm; nor do they recite a fundamental economic or longstanding commercial practice. Instead, they address a business challenge of making a sale when the purchase hinges upon input to the consumer from another regarding the opinion of another. Thus, the embodiments do not "merely recite the performance of some business practice known from the pre-Internet world along with the requirement to perform it on the Internet." Instead, the embodiments are necessarily rooted in retail, financial and social media technology in order to overcome a problem specifically arising in the realm of making a delayed retail purchase based on input from another.

With reference now to FIG. 1, a flowchart 100 for performing a contingent purchase is shown in accordance with an embodiment. In general, contingent purchase refers to a consumer selecting a product that they would like to purchase and then setting one or more conditions that need to be met before the purchase is completed. Basically, driving intent to purchase toward a purchase transaction. The contingent purchase can be used on E-commerce 102, M-commerce 103, or other commerce sources 104.

For example, when shopping, a consumer often finds a product 110 about which a second (or additional) opinion is desired before the purchase is made. The consumer would like to ask one or more friends, a spouse, a family member, etc. their opinion before making the purchase. However, it may be the situation that the opinion response is not presently available. Thus, if the consumer is shopping in a brick and mortar store (M-commerce 103), the consumer may leave the store before the response is received. Similarly, if the consumer is shopping online (E-commerce 102), the consumer may have moved on to work, driving home, or otherwise be away from the computer (or the shopping website) when the response is received.

Thus, the contingent purchase aspects discussed herein allows a consumer to select a product 110 that may be purchased, set one or more conditions 120, and authorize the purchase contingent on the one or more conditions 120 being met. The product 110 for possible purchase is then shared with friends, via email, text, social media, etc. When the friends respond, their responses are monitored and if the responses reach a pre-defined condition, (e.g., a condition precedent) within a pre-defined time period, the transaction is authorized.

With reference still to FIG. 1, the consumer will select a product 110. Product 110 can be any product that is available for purchase. It may be a song, item of clothing, entire outfit, food, gift card, and the like. Basically, product 110 is an item that a consumer believes to be a proper purchase, but wants to receive further feedback from friends before finalizing the deal.

For example, product 110 is a shirt that the consumer would like to purchase, but they are unsure of the color, size, material, whether or not it match their shoes/pants, etc. In another example, product 110 is a gift card for a friend and the consumer would like to confirm that it is the right coffee shop, restaurant, ice cream place, etc. for the friend. In yet another example, product 110 is a piece of furniture and the consumer would like to confirm with their significant other, or roommates, that the furniture is the right type, size, color, cost, material, etc. Although a few examples are provided, they are meant as a few of the many types of possible products and choices that a consumer would face during a purchase and request opinion feedback.

Once the product is selected, the consumer will select one or more conditions 115. The conditions can be selected from a preexisting list or made up by the consumer on the spot. A number of conditions are shown in condition list 120. The condition list 120 includes conditions such as a number of likes, contributions, time, availability, compliments, social curation, registry, price, size, color, etc. Social curation refers to a collaborative sharing environment about one or more particular topics. Contributions refer to an amount that is contributed to the consumer toward the purchase of the product.

In one embodiment, the condition that is selected is for a fixed product purchase. That is, the product to be purchased is pre-defined by the consumer and the only action to be accomplished by the condition is whether or not the purchase should be made. For example, the consumer may set the condition to be a certain number of likes for a set of silverware. The consumer sets condition to receiving ten likes before the transaction is completed. If the 10 likes are reached before the time has expired then the transaction will be completed. If 10 likes are not obtained, then the purchase transaction is not completed.

In one embodiment, the condition that is selected is for a modifiable product purchase. That is, the product to be purchased is loosely defined by the consumer and the action to be accomplished by the condition(s) include not only whether the purchase should be made, but also other aspects of the purchase such as color, size, material, pattern, and the like. For example, the consumer may set the condition to be a certain number of likes for a set of silverware however, there is a plurality of different sets of silverware within a pre-defined price range each having a different pattern, utensil count, manufacturer, etc. The consumer can set the condition to select a certain product for purchase based on whichever set of silverware receives the most likes within a certain time period. When the time period has tolled, whichever set of silverware has received the most likes will be purchased when the transaction is completed. Moreover, the set of conditions include an additional condition such as, if no set receives more than 7 likes, then the purchase transaction is not completed.

In another example, the consumer may set the condition to be a specific like (e.g., a like from a spouse, a best friend, a mother, etc.) for a collared shirt. However, there is a plurality of different colors of the shirt available. The consumer can set the condition to be the collared shirt to be purchases is based on whichever color shirt is indicated by the specific person's opinion. When the response is received from the specifically identified person, whichever color of the collared shirt the response indicates will be the color of the collared shirt purchased when the transaction is completed. Moreover, in one embodiment the set of conditions will include an additional condition such as, if no color is indicated, then the purchase transaction is not completed.

Thus, it can be seen that the range and scope of the conditions can range from a very loose and general opinion (e.g., like it or not), into a guided opinion (e.g., what does the group think is a better choice), and all the way to a specific opinion (e.g., Mom should I buy this).

With reference still to FIG. 1, after selecting a product 110 and selecting the condition(s) 115, the consumer will authorize the transaction 125. The authorizing of the transaction can be via a user inputting the information for a credit account, a gift card, or otherwise provide payment details for the purchase of product 110.

After the consumer authorizes the transaction, at 130 the authorization will be suspended. That is, the authorization will be held in abeyance until the condition(s) are met 150 or the overall time for completing the purchase has expired 155.

At 135, the conditions are monitored. Block 140 provides a number of solutions that may occur regarding the conditions being monitored. The solution may be a trigger, threshold, expiration, action, or the like. A trigger refers to a condition being met that causes instant purchase of the product. As in the above example, if the condition is the approval of a specific person, then when the specific person's approval is received, the condition is met. A threshold refers to a condition, such as receiving 7 likes. In that case, as soon as 7 likes are received, the condition is met 150. Expiration refers to a condition such as collecting responses for a specified period of time. When the specified period of time lapses, the responses are evaluated and any other conditions are evaluated. An action refers to a condition such as described above wherein a decision is made based on the responses, e.g., should consumer buy red shirt or yellow shorts. When the action is complete and the condition is met, the decision to buy red shirt or yellow shorts is met 150. If the condition is not met 150, then one embodiment continues to monitor conditions 135. In one embodiment, this loop can continue indefinitely or until a specified time period for the purchase authorization has expired as described in the lifespan discussion below.

At 145 the conditions selected are synched with the conditions monitored in block 140. That is, block 140 provides a number of solutions that can occur regarding the selected conditions 120 that are being monitored.

When the condition is met 150, in one embodiment, a check is made to see if the time period for the authorization of the purchase has expired 155. For example, the authorization of the transaction 125 will include a lifespan. One example of a lifespan is 5 business days. In one embodiment, the consumer sets the lifespan for the condition to remain valid. However, in another embodiment, the lifespan is a default time period.

If the conditions placed on the purchase are not met within the lifespan then at 170 the suspension is released, the authorization is canceled and the purchase is not made, e.g., the option to purchase ends. In another embodiment, the lifespan is evaluated at the same time the conditions are monitored such that the purchase authorization expires even if the condition is not met. In other words, monitoring conditions 135 will also monitor the lifespan and end the monitoring if the conditions are not met at the time the lifespan of the authorized transaction expires.

However, if when the condition is met 150, the lifespan of the authorized transaction has not expired 155, then the transaction is completed 160.

In one embodiment, the completed transaction 160 will cause shipment 165 of the product to the consumer. However, in another embodiment, the completed transaction 160 will send a message to the consumer, to let the consumer know the product is available for pick-up. For example, if the consumer didn't want to pay shipping, the consumer could have an alert sent to them to let them know the product is available for pick-up at the store.

Figure 2:
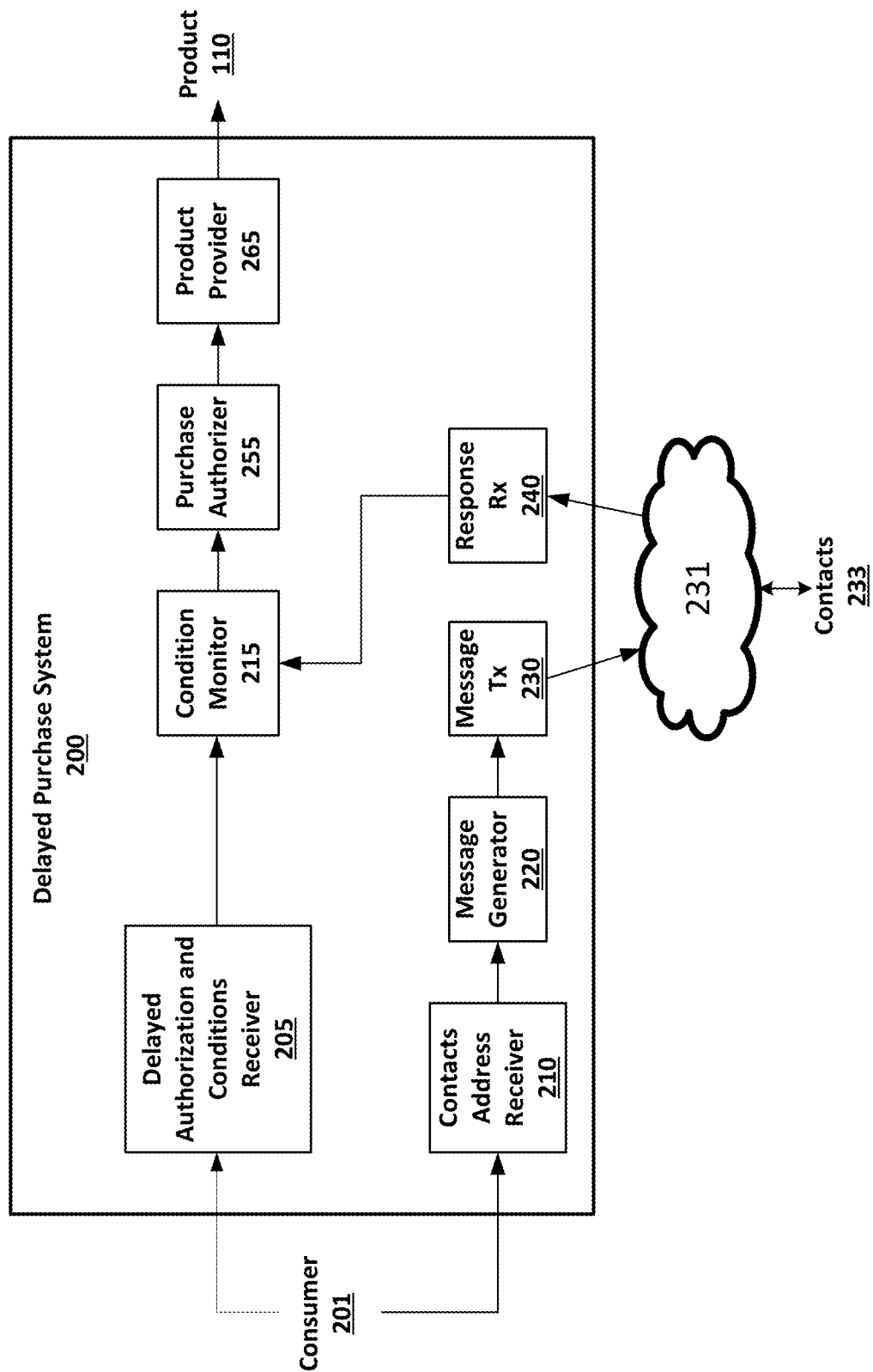
FIG. 2 is a flow diagram of the delayed purchase system, in accordance with an embodiment.

Referring now to FIG. 2, a flow diagram of the contingent purchase system is shown in accordance with an embodiment. Delayed purchase system 200 includes a delayed authorization and conditions receiver 205 which will receive the product 110, conditions 115 and transaction authorization and suspend the authorization 130 until the condition monitor 215 determines that the conditions are met.

At 210 delayed purchase system 200 receives the contacts addresses that the consumer provides for the selected friends to whom the opinion question should be sent. The contact addresses may be email, phone numbers for text messages, social media contact information, and the like. The contact information will be provided to message generator 220 which will generate a message to be sent to the friend(s) via email, text, social media, or the like. Once the message is generated it will be transmitted by message transmitter 230 over network 231 to contacts 233. The message response from contacts 233 will be received by response receiver 240. Network 231 is a wired, wireless, or mixed communication network such as the Internet, WiFi, Cellular, Bluetooth, NFC, wide area network, local area network, and the like.

Figure 3:
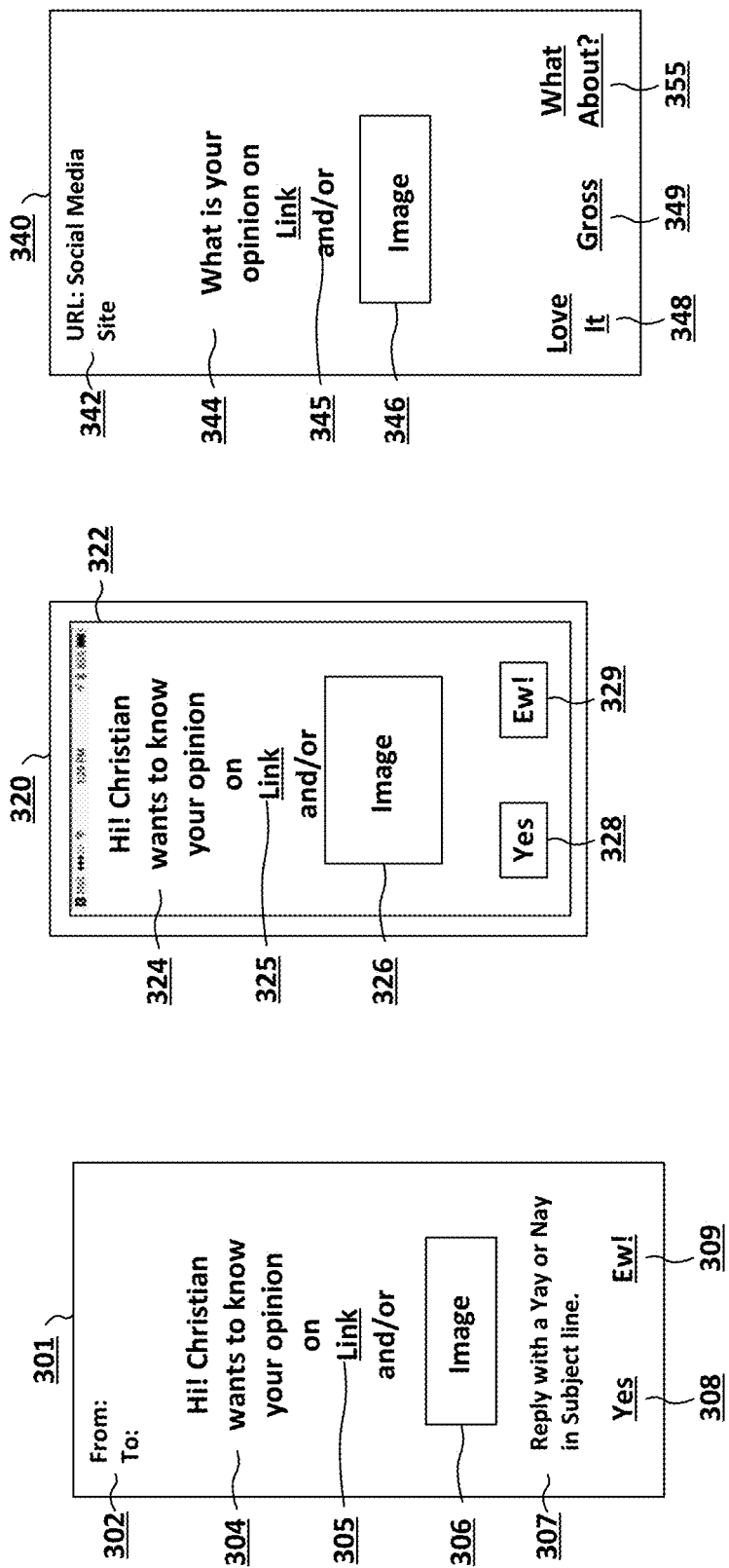
FIG. 3 is a block diagram of a number of different message types and formats, in accordance with an embodiment.

With reference now to FIG. 3, a block diagram of a number of different message types and formats is shown in accordance with an embodiment.

At 301 an example of an email is shown in accordance with an embodiment. In one embodiment, the email header 302 will indicate that the message was sent to the designated friends and that it was sent from the message transmitter 230 of delayed purchase system 200. As such, a friend would receive an email from the delayed purchase system 200 that would provide the question 304 as to like or don't like the product for the consumer. The message will include a link 305 and/or an image 306 of the product. In one embodiment, the message will also include directions 307 on how to respond to the email. In one embodiment, the message will include a direct "yes" link 308 and/or "ew" link 309 which will allow the receiver to respond simply by clicking on the link. When the friend replies to the email, it is sent back to the delayed purchase system 200 that will receive the message response 240 and use the response to update the condition.

At 320 an example of a text message is shown in accordance with an embodiment. The delayed purchase system 200 can also be used in a text based system, SMS system, etc. Thus, a text, SMS, or the like is sent from the delayed purchase system 200 and the response to the text, SMS, or the like is received at the delayed purchase system 200. In one embodiment, the friend would receive a text from the delayed purchase system 200 that would provide the question 324 as to the friend's opinion about the product for the consumer. The message will include a link 325 and/or an image 326 of the product. In one embodiment, the message will also include directions on how to respond to the text. In one embodiment, the message will include a direct yes link 328 and/or ew link 329 which will allow the receiver to respond simply by clicking on the link. When the friend replies to the text, it is sent back to the delayed purchase system 200 that will receive the message response 240 and use the response to update the condition.

At 340 an example of a social media message is shown in accordance with an embodiment. In one embodiment, the delayed purchase system 200 uses the underlying social media API to retrieve the consumer's social media address book and present the consumer with the address book, the consumer will select the friends to whom the opinion question should be sent. In one embodiment, the friend would receive a message on their social media platform (e.g., at URL 342) from the delayed purchase system 200 that would provide the question 344 as to the friend's opinion about the product for the consumer. The message will include a link 345 and/or an image 346 of the product. In one embodiment, the message will also include directions on how to respond to the text. In one embodiment, the message will include a direct "love it" link 348, a "gross" link 349, or a "what about" link 355. In one embodiment, the message will allow the receiver to respond simply by clicking on the link. When the friend replies to the social media message, it is sent back to the delayed purchase system 200 that will receive the message response 240 and use the response to update the condition.

In general, any or all of the different message types may include the "what about" link. The "what about" link or option would allow the friend receiving the message to select a different option, e.g., a different pattern, color, size, brand, material, etc. and provide the response to delayed purchase system 200.

With reference again to FIG. 2, once delayed purchase system 200 receives a response from response receiver 240, the information from the responding emails, texts, and the like will be provided to condition monitor 215 which will use the responses received to update the condition as described by condition monitor 135 of FIG. 1. While the time period of the condition is tolling, the delayed purchase system 200 will continue to tally the responses received. If the condition is met, e.g., 10 likes are received; the delayed purchase system 200 will pass the information to purchase authorizer 255 to automatically complete the transaction 160, e.g., bill the consumer and send out the notification causing the product to be provided to the consumer. In one embodiment, product provider 265 will authorize the shipping of product 110 to the consumer's address. In another embodiment, product provider 265 will send the consumer a message (e.g., email, text, DM, or the like) that product 110 is available for pick up at a given location.

Similarly, if the consumer has set the condition based on a product 110 in a brick and mortar store, the consumer can select that the product 110 be shipped when the condition is met. In one embodiment, the shipping may not be from the specific brick and mortar store, but instead from the store's ecommerce or catalog purchasing system.

However, if there is an additional cost associated with the shipping from the store, if it is convenient, or if the consumer so chooses, the consumer will have the option that when the condition is met, they could come back to the store to pick up the product 110. That is, the product provider 265 will send the consumer a message (e.g., email, text, DM, or the like) to let the consumer know the purchased product is available for pick up at a given location.

Example Computer System

Figure 4:
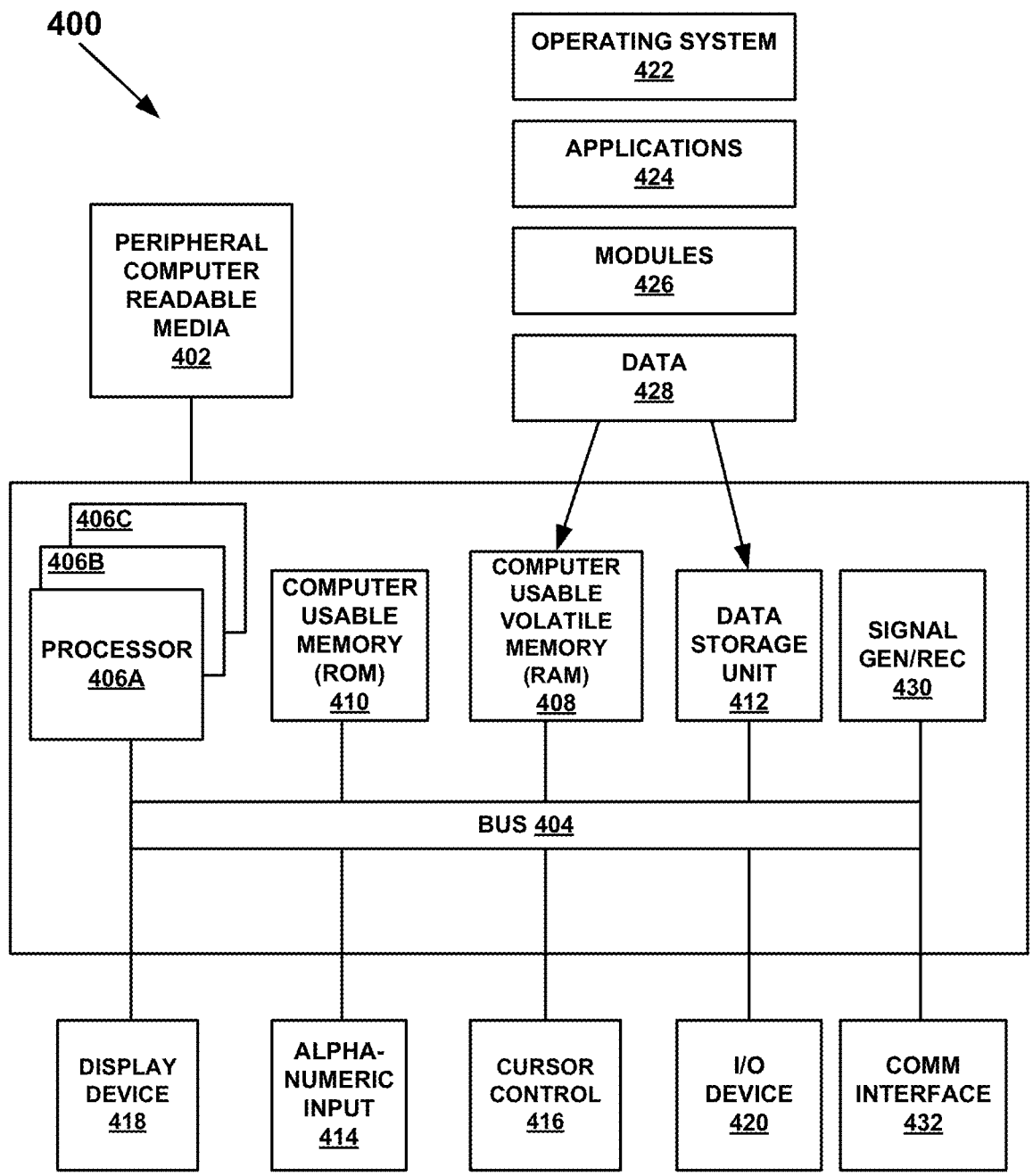
FIG. 4 is a block diagram of an example computer system with which or upon which various embodiments of the present invention may be implemented.

With reference now to FIG. 4, a block diagram of an example computer system 400 with which or upon which various embodiments of the present invention may be implemented is shown. It should be appreciated that one or more of the embodiments may be composed of computer-readable and computer-executable instructions that reside, for example, in a non-transitory computer-readable medium.

Computer system 400 may be a mobile computing device, notebook computing device, or desktop computing device. Example of mobile computing device include a mobile phone, a smart phone, a tablet, a smart watch, a piece of smart jewelry, smart glasses, or other user portable computational devices having wireless connectivity.

Although FIG. 4 illustrates an example computer system 400 used in accordance with embodiments of the present technology. It is appreciated that system 400 of FIG. 4 can operate on or within a number of different computer systems including general purpose networked computer systems, computer-readable and computer-executable instructions that reside, for example, in non-transitory computer-readable medium, embedded computer systems, routers, switches, server devices, user devices, various intermediate devices/artifacts, stand-alone computer systems, mobile phones, personal data assistants, televisions and the like.

Computer system 400 of FIG. 4 is well adapted to having peripheral computer readable media 402 such as, for example, an external storage drive, a compact disc, a flash drive, a thumb drive, a wireless radio enabled device, and the like coupled thereto.

Computer system 400 of FIG. 4 includes an address/data/control bus 404 for communicating information, and a processor 406A coupled to bus 404 for processing information and instructions. As depicted in FIG. 4, system 400 is also well suited to a multi-processor environment in which a plurality of processors 406A, 406B, and 406C are present. Conversely, system 400 is also well suited to having a single processor such as, for example, processor 406A. Processors 406A, 406B, and 406C may be any of various types of microprocessors. Computer system 400 also includes data storage features such as a computer usable volatile memory 408, e.g., random access memory (RAM), coupled to bus 404 for storing information and instructions for processors 406A, 406B, and 406C.

System 400 also includes computer usable non-volatile memory 410, e.g., read only memory (ROM), coupled to bus 404 for storing static information and instructions for processors 406A, 406B, and 406C. Also present in system 400 is a data storage unit 412 (e.g., a magnetic disk drive, optical disk drive, solid state drive (SSD), and the like) coupled to bus 404 for storing information and instructions. Computer system 400 also includes an optional alpha-numeric input device 414 including alphanumeric and function keys coupled to bus 404 for communicating information and command selections to processor 406A or processors 406A, 406B, and 406C. Computer system 400 also includes an optional cursor control device 416 coupled to bus 404 for communicating user input information and command selections to processor 406A or processors 406A, 406B, and 406C. Optional cursor control device may be a touch sensor, gesture recognition device, and the like. Computer system 400 of the present embodiment also includes an optional display device 418 coupled to bus 404 for displaying information.

Referring still to FIG. 4, optional display device 418 of FIG. 4 may be a liquid crystal device, cathode ray tube, OLED, plasma display device or other display device suitable for creating graphic images and alpha-numeric characters recognizable to a user. Optional cursor control device 416 allows the computer user to dynamically signal the movement of a visible symbol (cursor) on a display screen of display device 418. Many implementations of cursor control device 416 are known in the art including a trackball, mouse, touch pad, joystick, non-contact input, gesture recognition, voice commands, bio recognition, and the like. In addition, special keys on alpha-numeric input device 414 capable of signaling movement of a given direction or manner of displacement. Alternatively, it will be appreciated that a cursor can be directed and/or activated via input from alpha-numeric input device 414 using special keys and key sequence commands.

Computer system 400 also includes an I/O device 420 for coupling system 400 with external entities. For example, in one embodiment, I/O device 420 is a modem for enabling wired or wireless communications between system 400 and an external network such as, but not limited to, the Internet or intranet. A more detailed discussion of the present technology is found below.

Referring still to FIG. 4, various other components are depicted for system 400. Specifically, when present, an operating system 422, applications 424, modules 426, and data 428 are shown as typically residing in one or some combination of computer usable volatile memory 408, e.g. random access memory (RAM), and data storage unit 412. However, it is appreciated that in some embodiments, operating system 422 may be stored in other locations such as on a network or on a flash drive; and that further, operating system 422 may be accessed from a remote location via, for example, a coupling to the internet. In one embodiment, the present technology, for example, is stored as an application 424 or module 426 in memory locations within RAM 408 and memory areas within data storage unit 412. The present technology may be applied to one or more elements of described system 400.

System 400 also includes one or more signal generating and receiving device(s) 430 coupled with bus 404 for enabling system 400 to interface with other electronic devices and computer systems. Signal generating and receiving device(s) 430 of the present embodiment may include wired serial adaptors, modems, and network adaptors, wireless modems, and wireless network adaptors, and other such communication technology. The signal generating and receiving device(s) 430 may work in conjunction with one or more communication interface(s) 432 for coupling information to and/or from system 400. Communication interface 432 may include a serial port, parallel port, Universal Serial Bus (USB), Ethernet port, Bluetooth, thunderbolt, near field communications port, WiFi, Cellular modem, or other input/output interface. Communication interface 432 may physically, electrically, optically, or wirelessly (e.g., via radio frequency) couple system 400 with another device, such as a mobile telephone, radio, or computer system.

The computing system 400 is only one example of a suitable computing environment and is not intended to suggest any limitation as to the scope of use or functionality of the present technology. Neither should the computing environment be interpreted as having any dependency or requirement relating to any one or combination of components illustrated in the example computing system 400.

The present technology may be described in the general context of computer-executable instructions, such as program modules, being executed by a computer. Generally, program modules include routines, programs, objects, components, data structures, etc., that perform particular tasks or implement particular abstract data types. The present technology may also be practiced in distributed computing environments where tasks are performed by remote processing devices that are linked through a communications network. In a distributed computing environment, program modules may be located in both local and remote computer-storage media including memory-storage devices.

The foregoing Description of Embodiments is not intended to be exhaustive or to limit the embodiments to the precise form described. Instead, example embodiments in this Description of Embodiments have been presented in order to enable persons of skill in the art to make and use embodiments of the described subject matter. Moreover, various embodiments have been described in various combinations. However, any two or more embodiments may be combined. Although some embodiments have been described in a language specific to structural features and/or methodological acts, it is to be understood that the subject matter defined in the appended claims is not necessarily limited to the specific features or acts described above. Rather, the specific features and acts described above are disclosed by way of illustration and as example forms of implementing the claims and their equivalents.

What is claimed is:

1. A method for providing a delayed purchase based on input from another, said method comprising:
receiving, from a consumer and at a delayed purchase system, a contingent purchase selection of a product;
receiving, from said consumer and at said delayed purchase system, a selection of a plurality of other people, and contact information for each of said plurality of other people, said plurality of other people including a specific person identified by said consumer;
receiving, from said consumer and at a memory of said delayed purchase system, at least one condition to be met before a purchasing of said product can be completed,
said at least one condition to be met based on responses received from said plurality of other people, wherein said at least one condition is instantly met when an approving response is received from said specific person;
receiving, from said consumer and at said delayed purchase system, a suspended authorization for said purchasing of said product, said suspended authorization holding said purchasing of said product in abeyance until said at least one condition is met;
generating, at a message generator of said delayed purchase system, a contingent purchase message comprising:
a request for input regarding said product;
an identifier of said product, said identifier selected from a group consisting of: a selectable link to said product, and an image of said product;
a selectable yes link; and
a selectable no link, wherein a user input to either of said selectable yes link or said selectable no link will automatically provide a response to said delayed purchase system;
sending, from said delayed purchase system, said contingent purchase message to said contact information for each of said plurality of other people;
receiving, at said delayed purchase system, said response from said contingent purchase message sent to said plurality of other people;
updating, at said memory of said delayed purchase system, a status of said at least one condition based on said receiving of said response;
determining, at a condition monitor of said delayed purchase system, said at least one condition is met;
automatically purchasing, via said delayed purchase system, said product for said consumer when said condition monitor determines said at least one condition is met;
automatically generating, at said delayed purchase system, a purchase completed message; and
automatically sending, from said delayed purchase system and to said consumer, said purchase completed message, said purchase completed message informing said consumer said product has been purchased.

2. The method of claim 1 wherein said at least one condition is selected from a group consisting of a number of likes, a contribution, a time, an availability, a compliment, a social curation, a registry, a price, a size, and a color.

3. The method of claim 1 further comprising:
receiving, from said consumer and at said memory of said delayed purchase system, a plurality of conditions to be met before said purchasing of said product can be completed,
said plurality of conditions to be met via said response received from said plurality of other people, wherein one or more of said plurality of said conditions is instantly met when said response to said one or more of said plurality of said conditions is received from said specific person.

4. The method of claim 1 further comprising:
setting a lifespan for a time said suspended authorization for said purchasing of said product is valid; and
ceasing said updating of said status of said at least one condition when said lifespan expires.

5. The method of claim 1 wherein said contingent purchase message is an email message.

6. The method of claim 1 wherein said contingent purchase message is a social media message.

7. A non-transitory computer-readable medium for storing instructions, said instructions comprising:

one or more instructions which, when executed by one or more processors, cause one or more processors to:

receive, from a consumer and at a delayed purchase system, a contingent purchase selection of a product;

receive from said consumer and at said delayed purchase system, a selection of a plurality of other people, and contact information for each of said plurality of other people, said selection of said plurality of other people including a specific person identified by said consumer;

receive, from said consumer and at a memory of said delayed purchase system, at least one condition to be met before a purchase of said product can be completed, said at least one condition to be met based on responses received from said plurality of other people, wherein said at least one condition is instantly met when an approval response is received from said specific person;

receive, from said consumer and at said delayed purchase system, a suspended authorization for said purchase of said product, said suspended authorization held in abeyance until said at least one condition is met;

generate, at a message generator of said delayed purchase system, a contingent purchase message comprising:

a request for input regarding said product;

an identifier of said product, said identifier selected from a group consisting of: a selectable link to said product, and an image of said product;

a selectable yes link; and a selectable no link, wherein a user input to either of said selectable yes link or said selectable no link will automatically provide a response to said delayed purchase system;

send, from said delayed purchase system, said contingent purchase message to said contact information for each of said plurality of other people;

receive, at said delayed purchase system, said response from said contingent purchase message sent to said plurality of other people;

update, at said memory of said delayed purchase system, a status of said at least one condition based on said receipt of said response;

determine, at a condition monitor of said delayed purchase system, said at least one condition is met;

automatically purchase, via said delayed purchase system, said product for said consumer when said condition monitor determines said at least one condition is met;

automatically generate, at said delayed purchase system, a purchase completed message; and automatically send, from said delayed purchase system and to said consumer, said purchase completed message, said purchase completed message informs said consumer that said product has been purchased.

8. The non-transitory computer-readable medium of claim 7, where said instructions further comprise:

one or more instructions to:

receive, from said consumer and at said memory of said delayed purchase system, a plurality of conditions be met before said purchase of said product can be completed, said plurality of conditions to be met via said response received from said plurality of other people, wherein one or more of said plurality of said conditions is instantly met when said response to said one or more of said plurality of said conditions is received from said specific person.

9. The non-transitory computer-readable medium of claim 7, where said instructions further comprise:

one or more instructions to:

set a lifespan for a time said suspended authorization for said purchase of said product is valid; and cease said update of said status of said at least one condition when said lifespan expires.

* * * * *